（12）United States Patent
Brotto et al.

(10) Patent No.: US 9,344,008 B2
(45) Date of Patent: *May 17, 2016

(54) PORTABLE ALTERNATING CURRENT INVERTER HAVING REDUCED IMPEDANCE LOSSES

(71) Applicant: Black & Decker Inc., Newark, DE (US)

(72) Inventors: Daniele C. Brotto, Baltimore, MD (US); Nathan J. Cruise, Pheonix, MD (US); Erik Ekstrom, Woodstock, MD (US); Ren Wang, Timonium, MD (US); Mehdi T. Abolhassani, Austin, TX (US); William D. Spencer, Ellicot City, MD (US); Rouse Roby Bailey, Jr., New Park, PA (US); Andrew E. Seman, White Marsh, MD (US); Scott Eshleman, Parkville, MD (US)

(73) Assignee: Black & Decker Inc., New Britain, CT (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/673,356

(22) Filed: Mar. 30, 2015

(65) Prior Publication Data

US 2015/0207431 A1 Jul. 23, 2015

Related U.S. Application Data

(63) Continuation of application No. 12/917,128, filed on Nov. 1, 2010, now Pat. No. 8,994,336, which is a continuation-in-part of application No. 12/037,290, filed on Feb. 26, 2008.

(51) Int. Cl.
*H02J 7/00* (2006.01)
*H02M 7/537* (2006.01)
*H02J 7/34* (2006.01)
*H02M 7/00* (2006.01)
*H02M 7/49* (2007.01)

(52) U.S. Cl.
CPC ............. *H02M 7/537* (2013.01); *H02J 7/0065* (2013.01); *H02J 7/34* (2013.01); *H02M 7/003* (2013.01); *H02M 7/49* (2013.01)

(58) Field of Classification Search
CPC .................................. H02J 7/0065; H02J 7/34
USPC .................. 320/107, 111, 113, 128, 136, 141
See application file for complete search history.

(56) References Cited

U.S. PATENT DOCUMENTS

| 7,511,451 | B2 * | 3/2009 | Pierce | 320/103 |
| 8,994,336 | B2 * | 3/2015 | Brotto et al. | 320/136 |
| 2001/0043052 | A1 * | 11/2001 | Griffey et al. | 320/114 |

* cited by examiner

*Primary Examiner* — Edward Tso
*Assistant Examiner* — Aaron Piggush
(74) *Attorney, Agent, or Firm* — Michael Aronoff; Scott Markow

(57) ABSTRACT

A portable power supply apparatus is provided having reduced impedance losses. The portable power supply apparatus is comprised of: a portable housing; a battery system residing in the housing; and an inverter circuit residing in the housing. The battery system generates a direct current (DC) voltage having a magnitude greater than or equal to a peak value of a desired alternating current (AC) voltage. The inverter circuit receives the DC voltage directly from the battery system, converts the DC voltage to an AC output voltage and outputs the AC output voltage to one or more outlets exposed on an exterior surface of the portable housing.

20 Claims, 17 Drawing Sheets

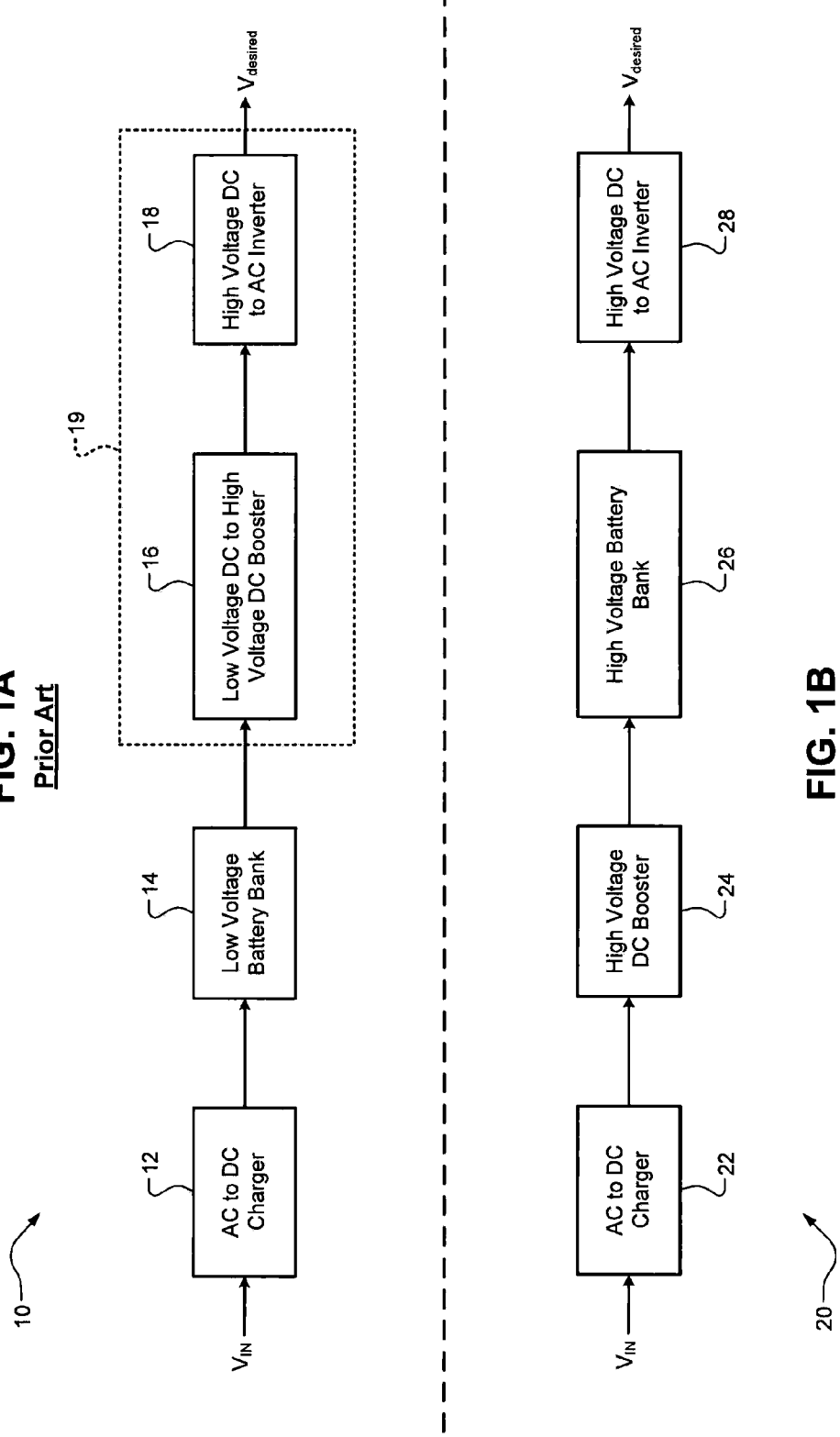

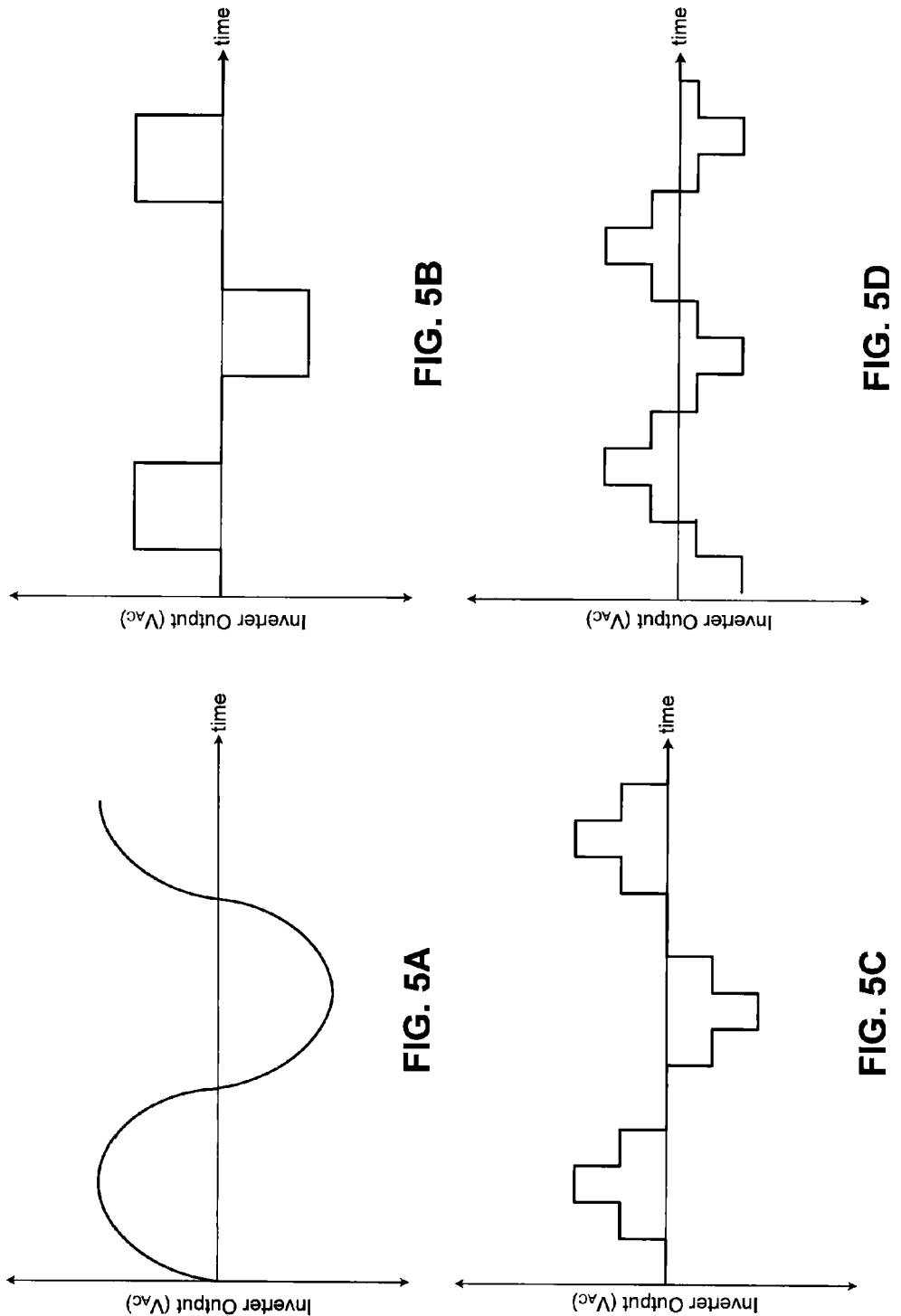

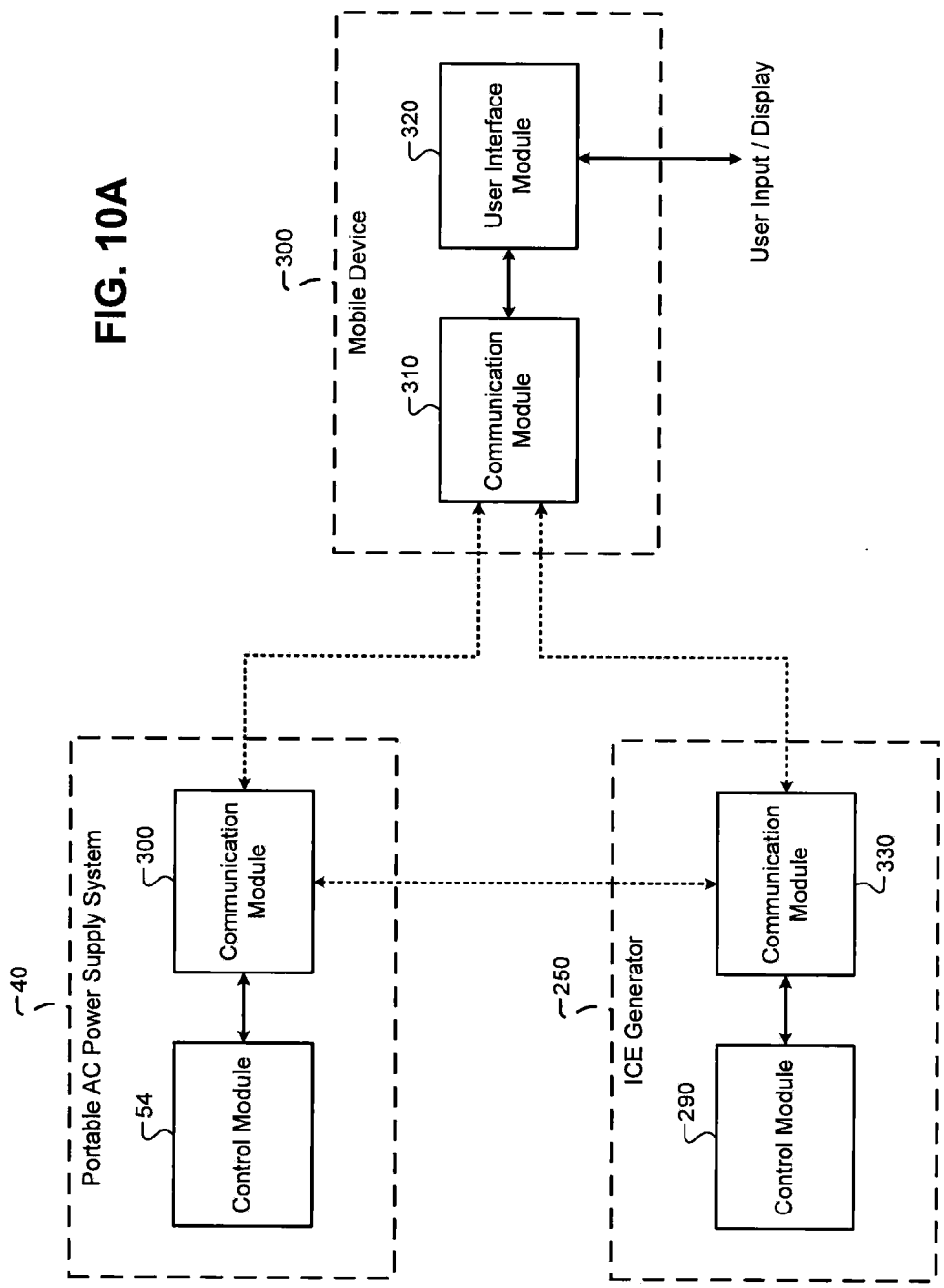

PORTABLE ALTERNATING CURRENT INVERTER HAVING REDUCED IMPEDANCE LOSSES

CROSS-REFERENCE TO RELATED APPLICATIONS

This application is a continuation of U.S. patent application Ser. No. 12/917,128 filed on Nov. 1, 2010 now pending, which is a continuation-in-part of U.S. patent application Ser. No. 12/037,290 filed on Feb. 26, 2008 now pending. The disclosures of the above applications are incorporated herein by reference in their entirety.

FIELD

The present disclosure relates to power supplies and more particularly to a portable alternating current (AC) inverter having reduced impedance losses.

BACKGROUND

Portable power supplies such as internal combustion engine (ICE) generators may be used to power remote devices. For example, portable power supplies may be used at construction sites to power electrical tools when no electrical power is available. Typical portable power supplies, however, may be too heavy and/or may generate an insufficient amount of power. For example, a single worker may be required to transport a portable power supply around a construction site and possibly between levels of a building (e.g., via a ladder). As the power generation of a portable power supply increases, however, the weight also increases. Specifically, larger generating devices (e.g., engines/alternators) may be required to provide adequate power to the point of use.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A portable power supply apparatus is provided having reduced impedance losses. The portable power supply apparatus is comprised of: a portable housing; a battery system residing in the housing; and an inverter circuit residing in the housing. The battery system generates a direct current (DC) voltage having a magnitude greater than or equal to a peak value of a desired alternating current (AC) voltage. The inverter circuit receives the DC voltage directly from the battery system, converts the DC voltage to an AC output voltage and outputs the AC output voltage to one or more outlets exposed on an exterior surface of the portable housing.

According to other features, the portable power supply apparatus may have a weight and output electrical power at a power-to-weight ratio greater than 50 watts (W) per pound. In other features, the portable power supply apparatus may weigh between 20 and 50 pounds. In other features, the portable power supply apparatus may generate greater than or equal to 1500 W of continuous power and/or greater than or equal to 3000 W of peak power.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a functional block diagram of a portable alternating current (AC) power supply according to the prior art;

FIG. 1B is a functional block diagram of a portable AC power supply according to one implementation of the present disclosure;

FIGS. 5A-5D are graphs of various AC output power waveforms according to various implementations of the present disclosure;

FIG. 10A is a functional block diagram of the portable AC power supply system, the ICE generator, and a remote device, each having remote monitoring and/or remote control features via radio frequency (RF) communication according to one implementation of the present disclosure;

DETAILED DESCRIPTION

Figure 2A:
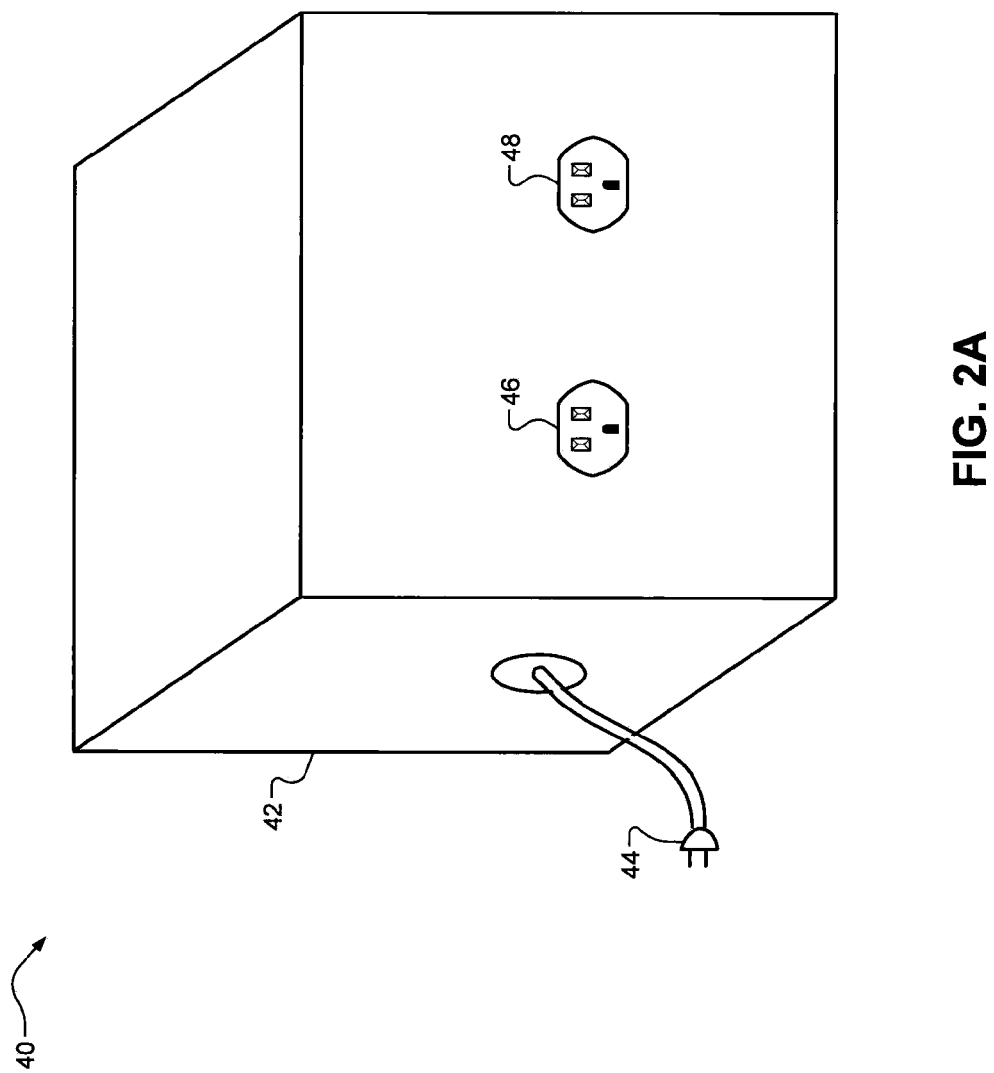
FIG. 2A is a view of a portable AC power supply system according to one implementation of the present disclosure.

FIG. 1A illustrates a portable alternating current (AC) power supply 10 according to the prior art. Specifically, portable AC power supply 10 includes an AC to direct current (DC) charger 12 that charges a low voltage battery bank 14 via a power source. The low voltage battery bank 14 supplies a low DC voltage to a low voltage DC to high voltage DC booster 16. For example, the low voltage battery bank 14 may be a large lead-acid battery that supplies a low DC voltage of 12V or 24V. The low voltage DC to high voltage DC booster 16 boosts the low DC voltage to a high DC voltage. A high voltage DC to AC inverter 18 then converts the high DC voltage to a desired AC output voltage. For example, the desired AC output voltage may be 120V.

A typical commercially available inverter 19 may include a combination of the low voltage DC to high voltage DC booster 16 connected before the high voltage DC to AC inverter 18. In other words, the low voltage DC to high voltage DC booster 16 may operate continuously to boost the low DC voltage to the high DC voltage. The low voltage DC to high voltage DC booster 16 may require a large amount of current and will have large power losses (i.e., $P=I^2 \times R$). Therefore, larger/thicker components may be required to decrease losses due to high impedance, which in turn increases the weight of the portable AC power supply 10.

FIG. 1B illustrates a portable AC power supply 20 according to one implementation of the present disclosure. Specifically, portable AC power supply 20 includes an AC to DC charger 22 that selectively charges a high voltage battery bank 26 via a power source. In some embodiments, the portable AC power supply 20 may also include a high voltage DC booster 24 between the power source and the high voltage battery bank 26 when a voltage greater than the voltage supplied by the power source is required.

The high voltage battery bank 26 may include a plurality of batteries that collectively generate a high DC voltage. For example, the high DC voltage may be greater than 178V. The plurality of batteries may include, but is not limited to, lithium-based batteries, zinc-based batteries, and/or potassium-based batteries. In one implementation, for example only, the high voltage battery bank 26 may include two banks of batteries connected in parallel, each bank having 60 lithium phosphate batteries connected in series, the high voltage battery bank 26 generating approximately 200V DC (e.g., 3.3V per cell×60 cells=198V). A high voltage DC to AC inverter 28 then converts the high DC voltage to a desired AC output voltage. For example, the desired AC output voltage may be 120V. Alternatively, for example, the desired AC output voltage may be 240V.

The portable AC power supply 20 requires much less current to operate compared to the continuously running low voltage DC to high voltage DC booster 16 of FIG. 1A. Therefore, connectors and cables may be thinner/smaller, which in turn decreases the weight of the portable AC power supply 20. For example, the portable AC power supply 20 may weigh between 20 and 50 pounds. In some implementations, the portable AC power supply 20 may weigh approximately 35 pounds.

Furthermore, the high voltage DC to AC inverter 28 is not a typical inverter configuration as shown in FIG. 1A (i.e., booster→inverter). Rather, the high voltage battery bank 26 directly supplies the high DC voltage to the high voltage DC to AC inverter 28. The portable AC power supply 20, therefore, may generate more output power than typical portable AC power supplies while weighing less than typical AC power supplies. For example only, the portable AC power supply 20 may generate greater than or equal to 1500 watts (W) continuous power. Additionally, the portable AC power supply 20 may generate greater than or equal to 3000 W of peak power. Therefore, the portable AC power supply 20 may have a power-to-weigh ratio of approximately 50 W per pound, and in some implementations greater than 100 W per pound.

FIG. 2A illustrates an outer view of an example portable AC power supply system 40. The portable AC power supply system 40 includes an enclosure 42 that houses an AC power supply module (not shown). The AC power supply module within the enclosure selectively charges a battery system via the AC source connector and an external AC power source. The battery system provides a high DC voltage which is converted to a desired AC voltage (e.g., 120V) by an inverter. Therefore, the AC power supply module is capable of providing AC power to remote devices while the battery system has sufficient charge.

The enclosure 42 allows the system 40 to be portable. For example, the portable AC power supply system 40 may be transported around a construction site. The enclosure 42 further includes an AC source connector 44 and outlets 46, 48 on its surface that interface with the AC power supply module. The AC source connector 44 (e.g., a standard three prong plug) allows the portable AC power supply system 40 to connect to an external AC power source. For example, the external AC power source may be an internal combustion engine (ICE) generator capable of 1000 W output power and weighing approximately 35 pounds. The external AC power source, however, may also be a different size/type of generator, a standard wall outlet, a thermal diode, a fuel cell, a solar panel, a wind turbine, etc. The outlets 46, 48 allow devices (e.g., power tools) to receive AC power at remote locations. For example, the outlets 46, 48 may be standard three prong outlets.

Figure 2B:
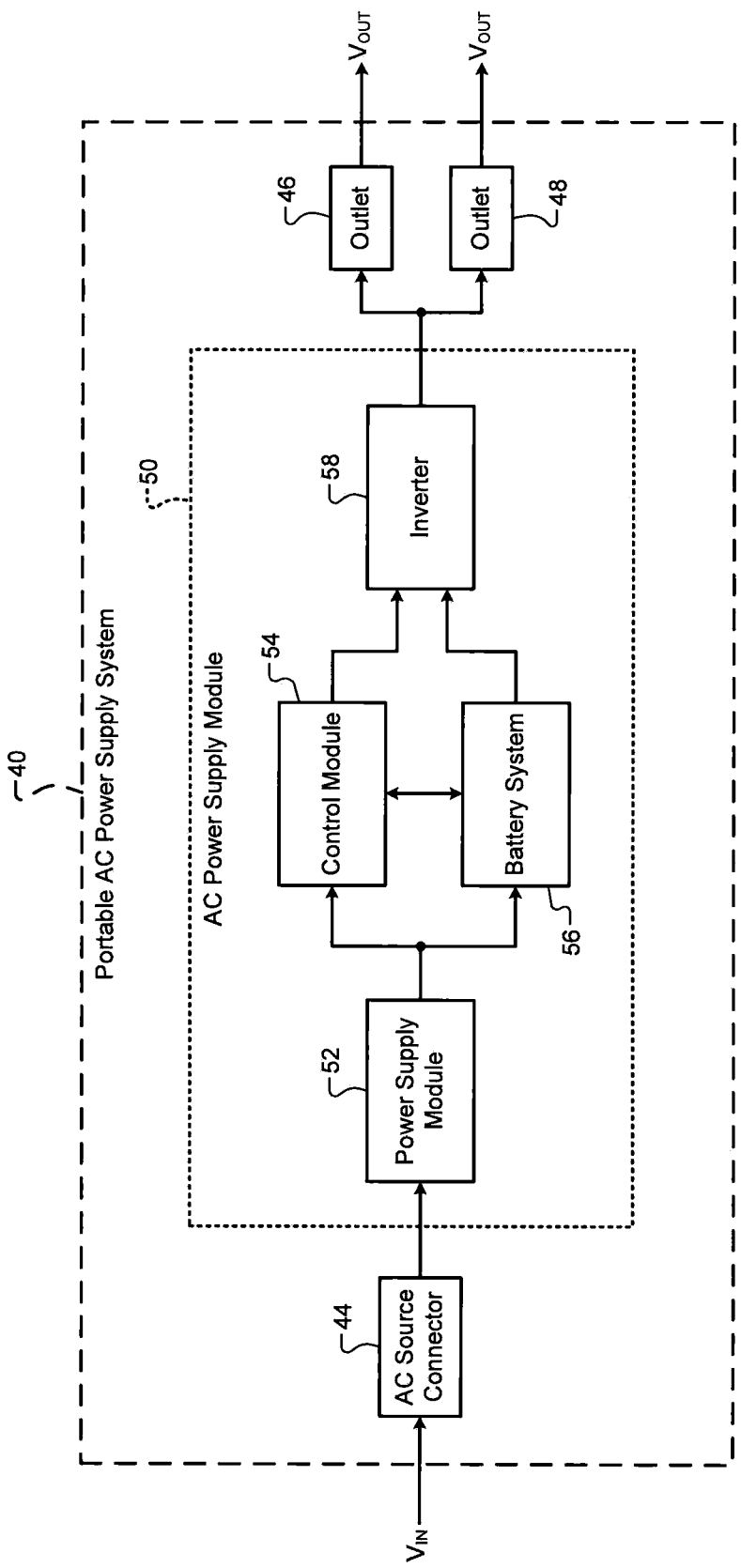
FIG. 2B is a functional block diagram of the portable AC power supply system according to one implementation of the present disclosure.

Referring now to FIG. 2B, a functional block diagram of the example portable AC power supply 40 is shown. The portable AC power supply 40 includes the AC source connector 44, outlets 46, 48, and the AC power supply module 50. The AC power supply module 50 includes a power supply module 52, a control module 54, a battery system 56, and an inverter 58. For example, the inverter 58 may be inverter 28 shown in and described with respect to FIG. 1B.

The power supply module 52 receives AC input ($V_{IN}$) from an external power source (e.g., ICE generator). The power supply module 52 converts the AC input into DC power to power the control module 54 and for recharging the battery system 56. The control module 54 selectively controls recharging of the battery system 56. More specifically, the control module 54 enables charging of the battery system 56 when a charge level is less than a threshold. Similarly, the control module 54 may disable charging of the battery system 56 when the charge level is greater than a threshold to prevent overcharging. The portable AC power supply 40, however, may also generate output power independently of an external power source (i.e., when not connected to an external power source) using the battery system 56. Additionally, the battery system 56 may include replaceable batteries. In other words, individual batteries, battery banks, or the entire battery system 56 may be removed and easily replaced with a fully-charged spare unit (i.e., "hot swappable"). For example, replaceable batteries may provide for extended operation without charging via an external AC source.

The battery system 56 supplies a DC voltage to the inverter 58. Specifically, the control module 54 controls discharging of the battery system 56 which supplies the DC voltage to the inverter 58. The inverter 58 converts the DC voltage to a desired AC voltage to output via outlets 46, 48. For example, the desired AC voltage may be 120V. The control module 54 may also control operation of the inverter 58. For example, the control module 54 may control switching frequencies of the inverter 58 thereby controlling a shape of the output waveform. The control of the inverter 58 is described in more detail later.

Figure 3A:
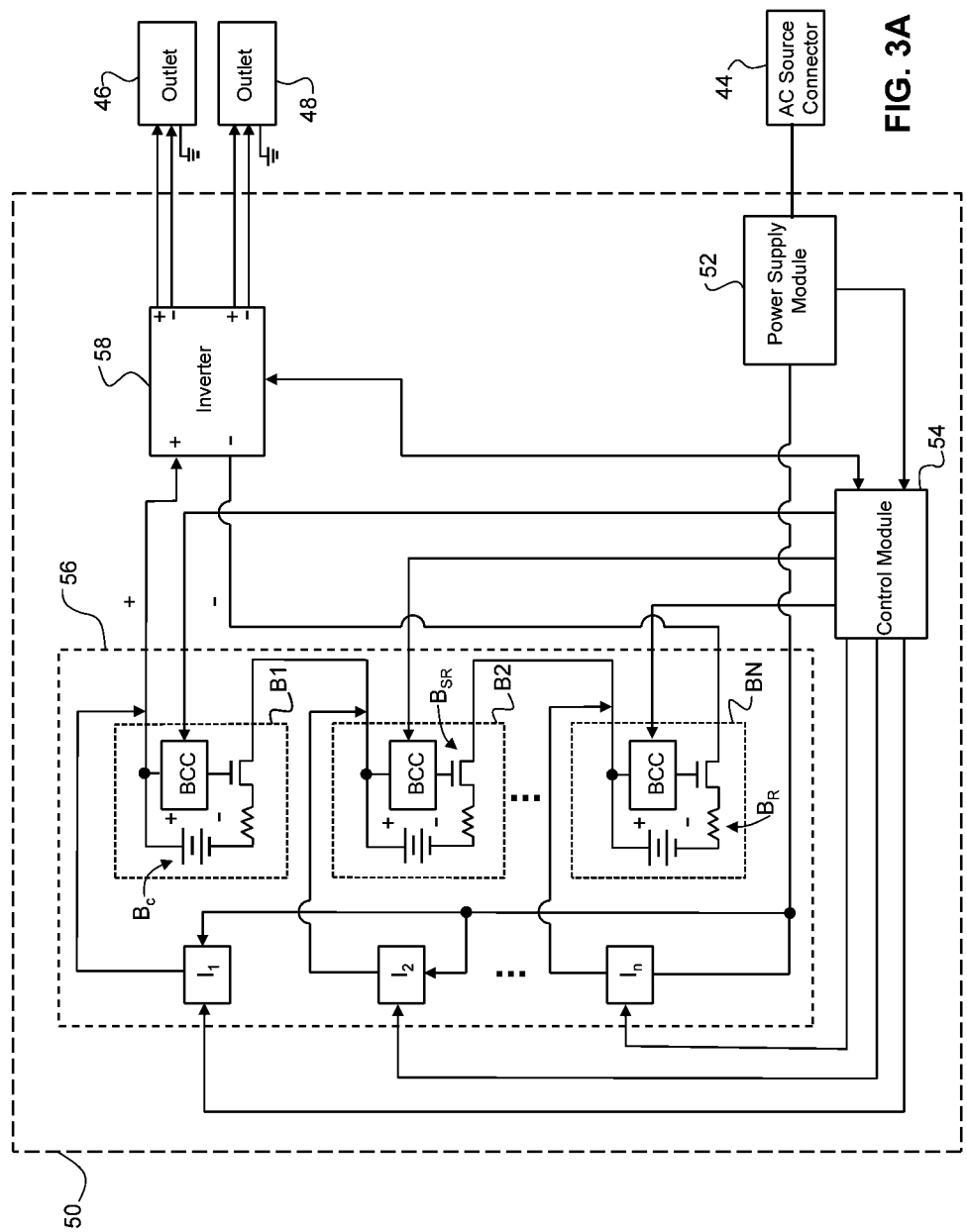
FIG. 3A is a schematic of an AC power supply module according to one implementation of the present disclosure.

Referring now to FIG. 3A, an example of the AC power supply module 50 is shown. The battery system 56 includes a plurality of battery banks $B_1$-$B_N$. Each of the battery banks $B_1$-$B_N$ includes a battery cell $B_C$, a switch $B_{SR}$, a resistor $B_R$, and a battery control module $B_{CC}$. For example, the switch $B_{SR}$ may be a semiconductor-based transistor. The resistor $B_R$ may also be referred to as a current sensor. The battery control module $B_{CC}$ receives information from the current sensor $B_R$ to control switching of the switch $B_{SR}$. The battery control module $B_{CC}$, however, may also receive other information, such as control signals from the control module 54 or information regarding other battery banks.

The power supply module 52 receives AC input from an AC source via the AC source connector 44. For example, the AC source may be a small ICE generator. Additionally, for example, the AC source connector 44 may be a standard three prong plug that connects to the AC source. The power supply module 52 converts the AC input to DC power for powering the control module 54 and for recharging the battery banks $B_1$-$B_N$. The control module 54 controls the charging of the battery banks $B_1$-$B_N$ via the DC power generated by the power supply module 52. Specifically, the power supply module 52 may provide DC power to current sources $I_1$-$I_N$ which selectively supply current to the battery banks $B_1$-$B_N$, respectively, based on control from the control module 54.

The control module 54 also controls discharging of the battery banks $B_1$-$B_N$ to the inverter 58. The series connection between the battery banks $B_1$-$B_N$ allows the control module 54 to supply a high DC voltage to the inverter 58. Different numbers of battery banks may be implemented depending on the application. Similarly, different numbers of battery cells may be implemented in the battery banks depending on the application. The DC voltage supplied to the inverter 58, however, should be greater than a peak voltage of a desired AC voltage output. In other words, for example, the DC voltage supplied to the inverter 58 should be approximately 178V for a desired 120V AC output.

The inverter 58 converts the high DC voltage supplied via the battery cells $B_1$-$B_N$ to an AC voltage. For example, the inverter 58 may convert the high DC voltage to 120V AC at a frequency between 50 and 60 hertz (Hz). The inverter 58, however, may also convert the high DC voltage to a different AC voltage having a different magnitude or frequency. When generating 120V AC, the power output of the inverter 58 may be greater than or equal to 1500 W continuous or 3000 W peak. The outlets 46, 48 may output the power generated by the inverter 58 to one or more remote devices (e.g., power tools). For example, the outlets 46, 48 may receive a standard three prong plug.

The control module 54 may also communicate with the inverter 58. Specifically, the control module 54 may monitor operation of the inverter. Based on the monitoring and/or other parameters (e.g., battery charge level, current flow, etc.), the control module 54 may control the inverter 58. More specifically, the control module 54 may control switching in the inverter 58 to shape the AC sine wave approximation output by the inverter 58. In other words, the AC sine wave output by the inverter 58 may be a square wave having a plurality of steps to achieve an approximate shape based on a desired amplitude and frequency.

For example, as the battery charge level decreases the control module 54 may command the inverter 58 to increase the duty cycle of the inverter 58 effectively "stretching" the AC sine wave. The purpose of stretching the AC sine wave is to maintain a desired root-mean-squared (RMS) voltage output by the inverter 58 while having a lower DC voltage input to the inverter 58. Specifically, the control module 54 may increase a duty cycle of the inverter 58 to adjust the output AC sine wave to maintain desired RMS accuracy.

Figure 3B:
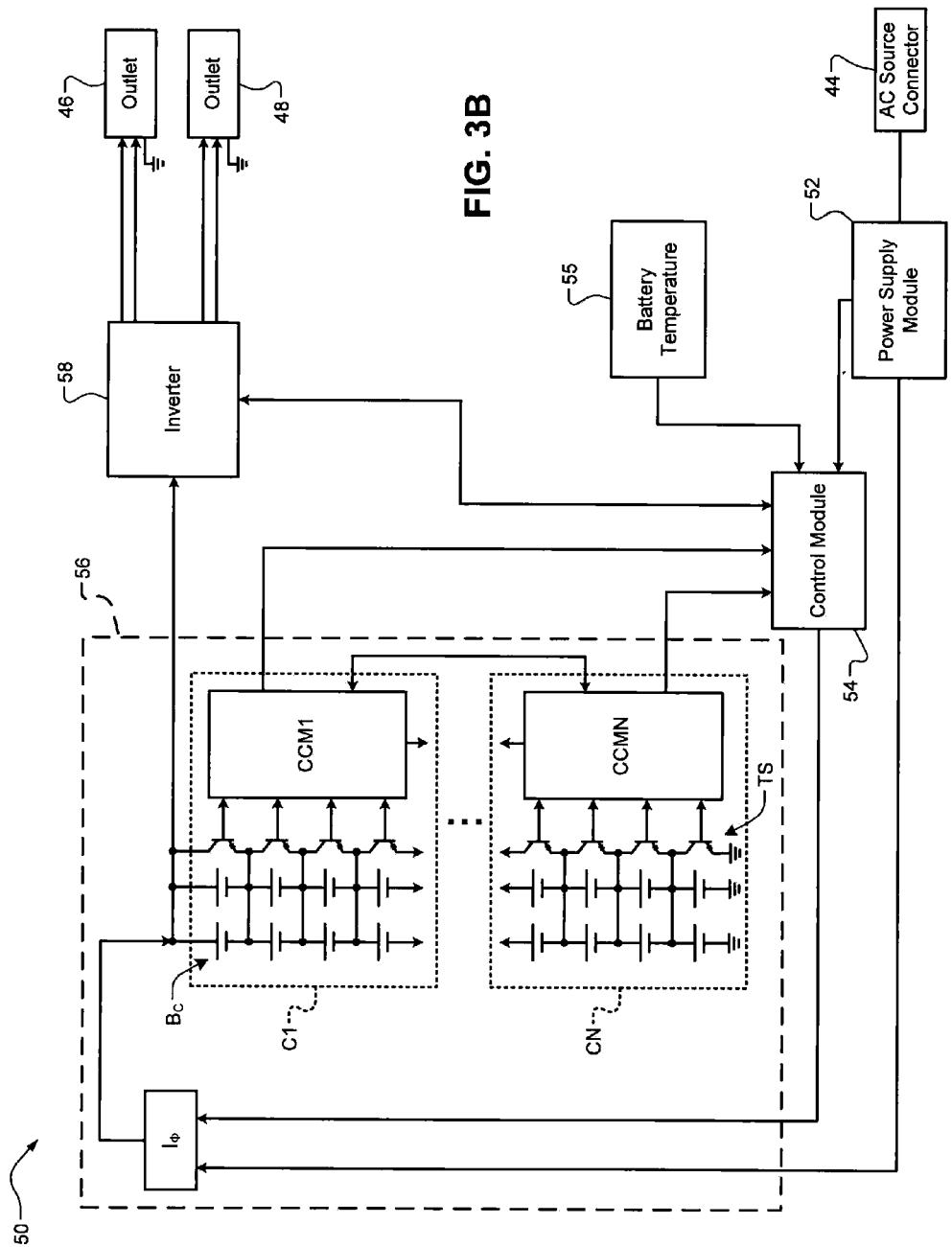
FIG. 3B is a schematic of an AC power supply module having a cluster control architecture according to one implementation of the present disclosure.

FIG. 3B illustrates an example of the AC power supply module 50 having a cluster control architecture. Similar to FIG. 3A, the power supply module 52 receives AC input power via the AC source connector 44. For example, the AC source connector 44 may be a standard three prong plug that connects to an external AC source (e.g., an ICE generator). The power supply module 52 converts the AC input to DC power for powering a control module 54 and for recharging the battery system 56.

The battery system 56 is divided into a plurality of battery cells $B_C$. Specifically, the battery cells $B_C$ may be grouped in clusters $C_1$-$C_N$ each controlled by a cluster control module $CCM_1$-$CCM_N$, respectively. For example, cluster $C_1$ may include four pairs of discrete battery cells $B_C$ connected in parallel and four transistors $T_S$ connected across the terminals of each pair of battery cells $B_C$. While four pairs of battery cells $B_C$ are shown connected in parallel, other numbers of battery cells and other configurations may be implemented. The battery system 56 may also include diverting (i.e., bypass) circuitry used for charge balancing. For example, the control module 54 may control the diverting circuitry to bypass a battery cell/cluster when the corresponding charge level of a given cell/cluster exceeds a predetermined threshold.

The transistors $T_S$ are controlled by a respective cluster control module $CCM_1$-$CCM_N$, hereinafter referred to as CCM. The cluster control module CCM may control respective transistors $T_S$ to prevent overcharging of respective battery cells $B_C$. Specifically, the cluster control module CCM may switch transistor $T_S$ to shunt current flow through transistor $T_S$ effectively holding the voltage across corresponding battery cells $B_C$. Additionally, the cluster control module CCM may communicate with the control module 54 to have the control module 54 reduce a current supply $I_\phi$ to prevent overcharging of the battery cells $B_C$.

The inverter 58 converts the high DC voltage supplied via the battery cells $B_C$ to an AC voltage. For example, the inverter 58 may convert the high DC voltage to 120V AC at a frequency between 50 and 60 hertz (Hz). The inverter 58, however, may also convert the high DC voltage to a different AC voltage having a different frequency. When generating 120V AC, the power output of the inverter 58 may be greater than or equal to 1500 W continuous or 3000 W peak. The outlets 46, 48 may output the power generated by the inverter 58 to one or more remote devices (e.g., power tools). For example, the outlets 46, 48 may receive a standard three prong plug.

The control module 54 may also receive temperature measurements of the battery cells $B_C$. The temperature measurements may be generated by a battery temperature module 55. For example, the battery temperature module 55 may include one or more temperature sensors that monitor temperature of one or more of the battery cells $B_C$, respectively. The control module 54 may also communicate with the inverter 58 and send commands to control the inverter 58 as previously described with respect to FIGS. 2B and 3A and as further described later.

Figure 3C:
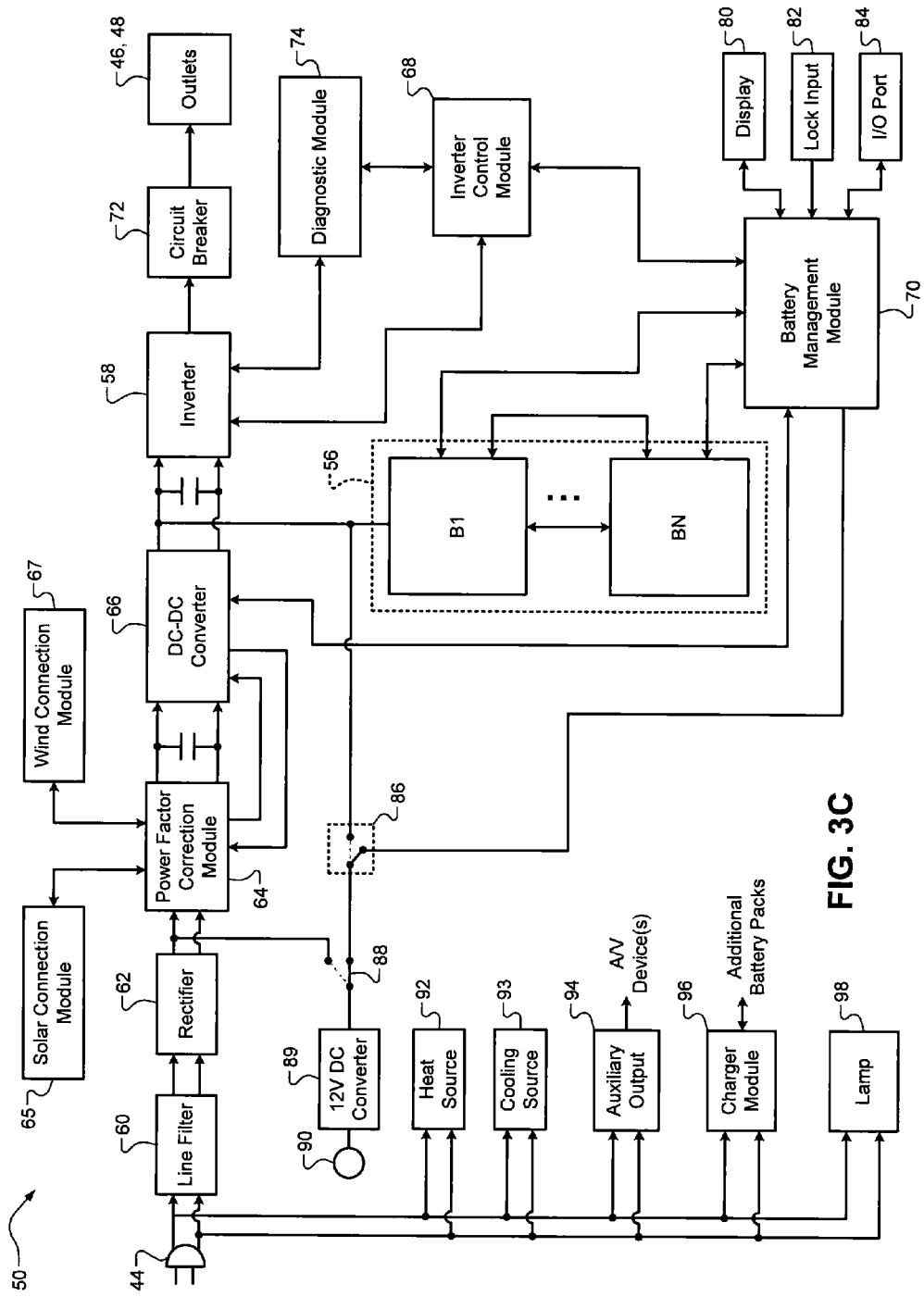
FIG. 3C is a schematic of an AC power supply module having inverter control architecture according to one implementation of the present disclosure.

FIG. 3C illustrates an example of the AC power supply module 50 having an inverter control architecture and other additional features. A line filter 60 removes noise from AC input via the AC source connector 44. A rectifier 62 converts the filtered AC to DC. A power factor correction (PFC) module 64 maintains an input power factor close to unity for the most efficient utilization of the AC input. The PFC stage may alternately be designed to directly produce/regulate the output DC current to the appropriate voltage/current level. This constant current/voltage output may be used to charge one or more of the battery banks $B_1$-$B_N$ and/or provide power to the inverter 58.

The PFC module 64 may interface with a solar panel via a solar connection module 65. The solar panel may provide for solar charging of the battery system 56. For example, the PFC module 64 may include an algorithm for maximum power point tracking (MPPT) for operating the solar panel. The MPPT algorithm, however, may be located and executed elsewhere such as in the solar connection module 65 or in an external solar panel control module (not shown). Specifically, the MPPT algorithm provides for control of electrical operating points of photovoltaic (PV) modules in the solar panel to maximize capturing of solar power. The PFC module 64 may also interface with a wind turbine via a wind connection module 67. The wind turbine may provide for wind-based charging of the battery system 56. The PFC module 64 may also include additional components that perform other features described in detail later such as adjusting the input load.

The inverter 58 converts DC voltage received from the DC-DC converter 66 and/or the battery banks $B_1$-$B_N$ to an output AC voltage. For example, the inverter may generate a desired AC voltage having a magnitude of 120V. The inverter 58 is controlled by an inverter control module 68. Specifically, the inverter control module 68 may monitor the peak of the AC voltage generated by the inverter 58 and control the inverter 58 accordingly. For example, when the peak of the AC voltage generated by the inverter 58 is less than the desired AC output voltage, the inverter control module 68 may increase a duty cycle of the inverter 58 to maintain a desired RMS voltage. The inverter 58 may output the AC voltage to a circuit breaker 72. The circuit breaker 72 may interrupt the flow of current to prevent damage to components connected via outlets 46 or 48. For example, the circuit breaker 72 may be a resettable circuit breaker. A diagnostic module 74 may include additional circuitry for providing current output information to the inverter control module 68 and/or a battery management module 70.

The battery management module 70 controls the battery system 56 which includes battery banks $B_1$-$B_N$. The battery banks $B_1$-$B_N$ may be connected in series. The battery management module 70 also communicates with the inverter control module 68. For example, the inverter control module 68 may notify the battery management module whether the inverter 58 is on or off, whether a load is connected to the inverter 58 via outlets 46 and/or 48, etc. Based on this information, the battery management module 70 may turn off the DC-DC converter 66, request a low current output, or request a high current output.

The battery management module 70 may be connected to a display 80. The display 80 may provide information to a user. For example, the information may include, but is not limited to a charge level of the battery system 56, a load connected to the system, an output voltage of the system, whether or not the system is connected to a charger, etc. The battery management module 70 may also be connected to an input/output (I/O) port 84. For example, the I/O port may provide for connection to a computer or other suitable device for software programming and/or downloading of data for analysis. Lastly, the battery management module 70 may have security via a lock input 82. For example, the lock input 82 may require a user to verify his or her identity (e.g., a fingerprint) before using the system.

The system may also provide 12V DC power via an alternate outlet 90 using the battery system 56 or AC source power (i.e., when AC source power is connected). Specifically, a semiconductor switch 88 may be used to switch between powering a 12V DC converter 89 from AC power or the battery system 56. For example, the alternate outlet 90 may be a cigarette lighter-type outlet. Another semiconductor switch 86 may be disposed between switch 88 and the battery system 56. Switch 86 may be controlled by the battery management module 70. For example, the battery management module 70 may open switch 86 to prevent over-discharge of the battery system 56.

A heat source 92 may be implemented for warming of the battery system 56. For example, the heat source 92 may be heat tape or blankets. Warming the battery system 56 may allow operation during colder temperatures. Similarly, a cooling source 93 may be implemented for cooling of the battery system 56. For example, the cooling source 93 may be a fan. Cooling the battery system 56 may prevent overheating. An auxiliary output 94 may provide for powering of audio/visual (A/V) devices such as a radio or a television. A charger module 96 may be used to charge additional battery packs. For example, removable/swappable battery packs from power tools may be charged via the charger module 96. Lastly, a lamp 98 may be implemented. For example, the lamp may include a bulb and a reflector disposed within a housing. The lamp 98 may be used to illuminate a work area.

Figure 4A:
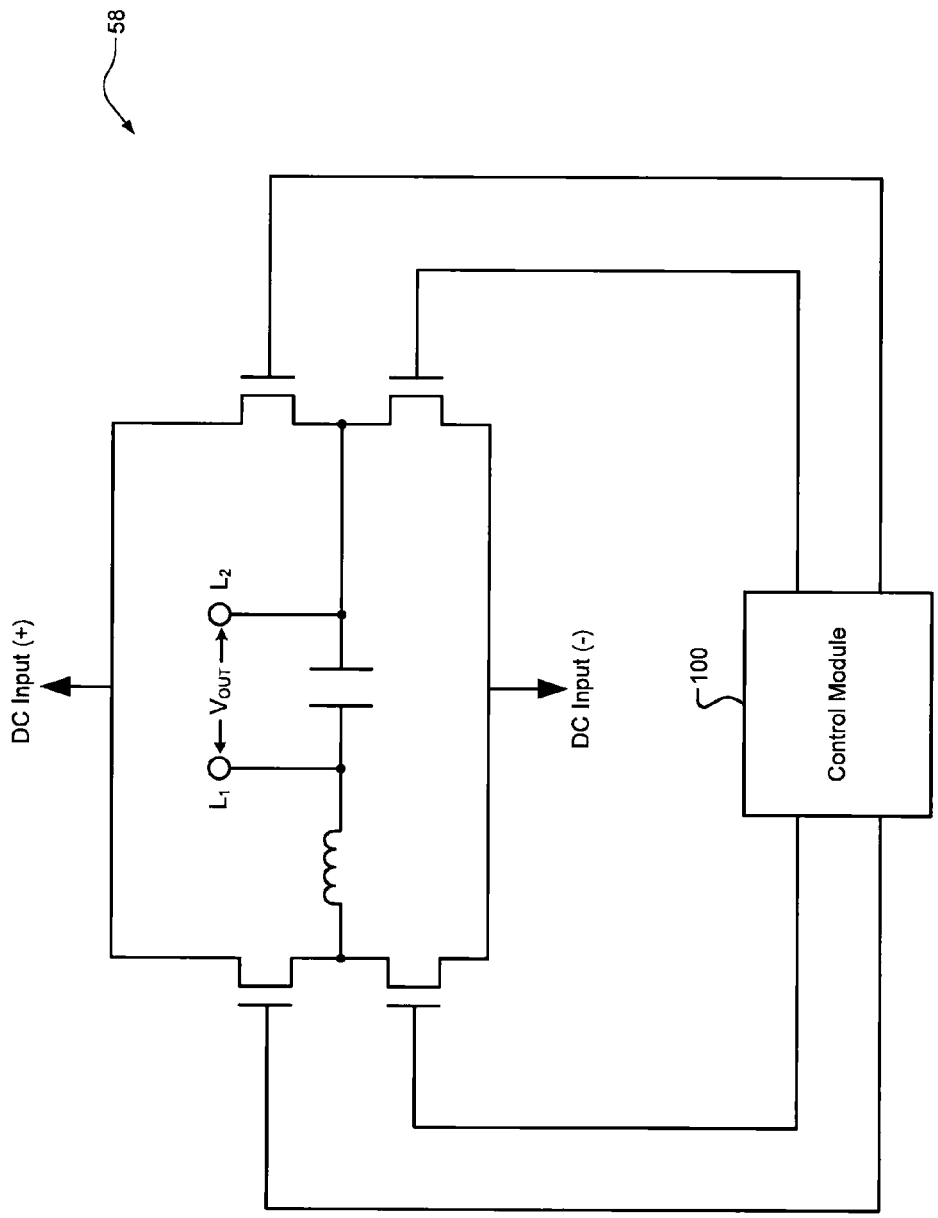
FIG. 4A is a schematic of an inverter according to one implementation of the present disclosure.

FIG. 4A illustrates an example of the inverter 58 that may generate a pure sine waveform as depicted in FIG. 5A. Specifically, the inverter 58 may include a full H-bridge with a passive filtered output. A control module 100 may control switching of four transistors via pulse-width modulated (PWM) control signals. For example, the control module 100 may control the transistors such that a full positive battery voltage or a full negative battery voltage is applied to the output $V_{OUT}$. The output $V_{OUT}$, however, is also filtered to smooth voltage steps and thus can be a pure sine wave. Specifically, the filter includes a passive LC filter that includes an inductor and a capacitor connected in series with the output $V_{OUT}$.

Figure 4B:
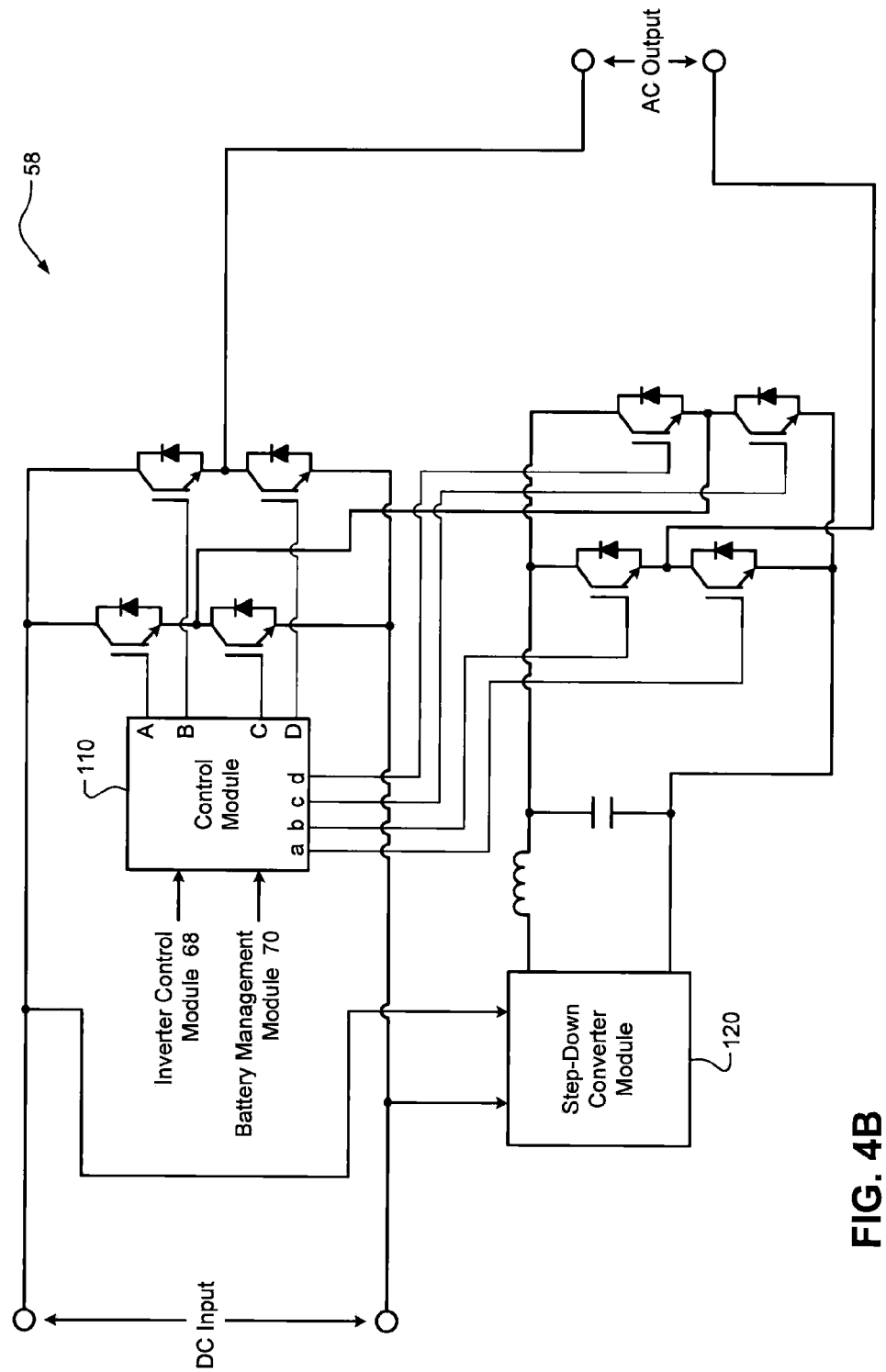
FIG. 4B is a schematic of an inverter according to another implementation of the present disclosure.

FIG. 4B, on the other hand, illustrates another example of the inverter 58 that is capable of generating the square and modified square waveforms of FIGS. 5B-5D. The inverter 58 may be generally described as an H-bridge with a polarity inverter (i.e., two H-bridges having opposing polarities). Specifically, the inverter 58 may include an isolated step-down converter module 120 having a voltage controlled output. The inverter 58 may also include a control module 110 which receives inputs from the inverter control module 68 and/or the battery management module 70.

The control module 110 may switch various transistors connected to the DC input and/or the output of the step-down converter module 120. For example, the transistors may be insulated-gate bipolar transistors (IGBTs). Specifically, the control module 110 may switch the transistors in a specific order to create a desired output AC waveform. The inverter 58 may manipulate the shape of the output waveform as previously described herein to generate the waveforms depicted in FIGS. 5B-5D. The modified sine wave of FIG. 5D represents an approximation of a desired AC voltage resembling the pure sine wave of FIG. 5A.

Figure 6B:
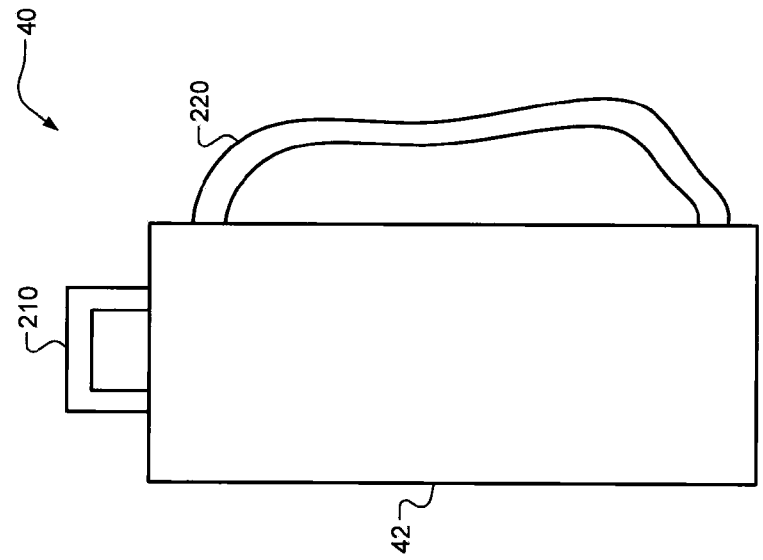
FIG. 6B is a view of the portable AC power supply system having various transport features according to one implementation of the present disclosure.
Figure 6A:
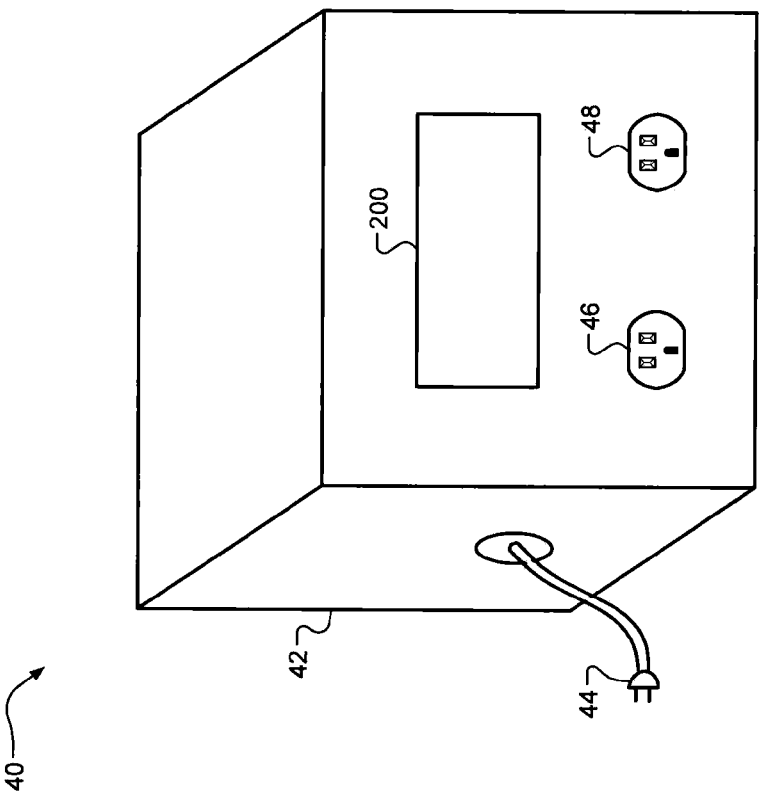
FIG. 6A is view of the portable AC power supply system having a display according to one implementation of the present disclosure.

Referring now to FIG. 6A, an example outer view of the portable AC power supply system 40 is shown. Specifically, the system 40 may include the AC power supply module 50 as shown in and described with respect to one of FIGS. 3A-3C. The enclosure 42 may further include a display 200 for displaying information about the system 40. In some embodiments, the display 200 may be the display 80 of FIG. 3C. For example, the display 200 may display information that includes, but is not limited to, a charge level of the battery system 56, a load connected to the system, an output voltage of the system, whether or not the system is connected to a charger, etc.

FIG. 6B illustrates a side view of the system 40 having various transport features. For example, the system 40 may include a handle 210 for carrying the system 40. Additionally or alternatively, for example, the system 40 may include a strap 220 for carrying the system 40. For example only, two straps 220 may be implemented to allow the system 40 to be carried on one's back in compliance with the Occupational Safety and Health Administration (OSHA) standards (e.g., transport up a ladder). The system 40 may also include other suitable features for carrying or transporting the enclosure, such as a cart, wheels, etc.

Figure 7B:
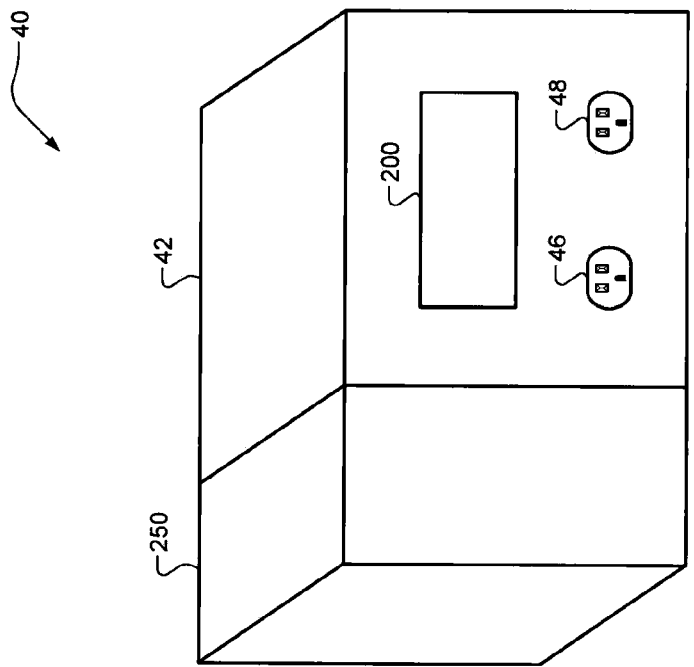
FIG. 7B is a view of the portable AC power supply system having an integrated ICE generator according to one implementation of the present disclosure.
Figure 7A:
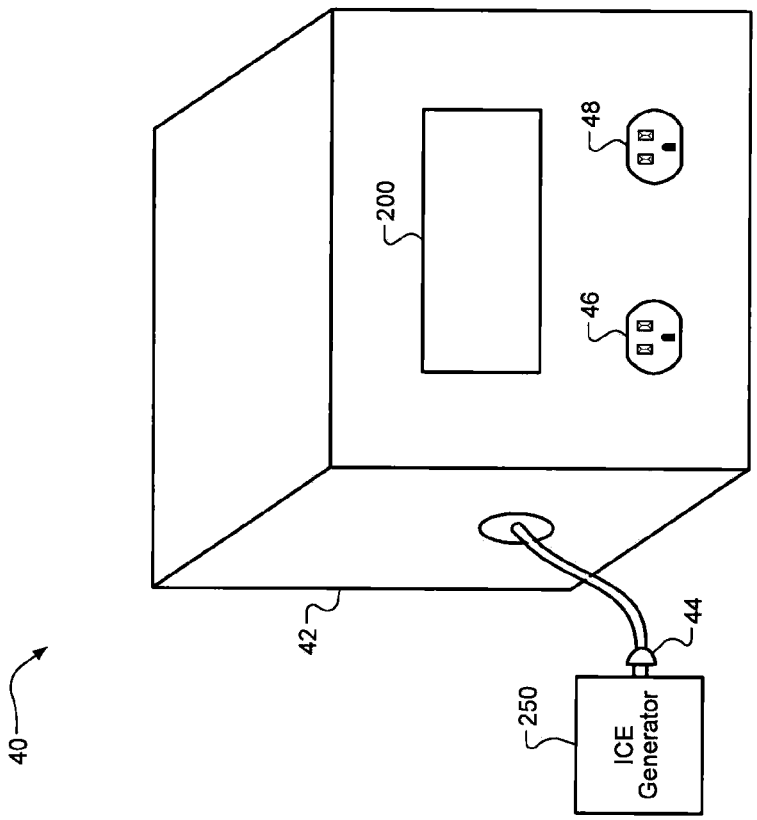
FIG. 7A is a view of the portable AC power supply system having an external internal combustion engine (ICE) generator according to one implementation of the present disclosure.

FIG. 7A illustrates an outer view of the system 40 connected to an internal combustion engine (ICE) generator 250 via the AC source connector 44. While an ICE generator 250 is shown, the system 40 may also be connected to another power source such as a fuel cell, a thermal diode, a solar panel, a wind turbine, or a different type of engine/generator. For example only, the ICE generator 250 may generate approximately 1000 W of power and may weigh approximately 35 pounds. The ICE generator 250 may be also be carried or transported along with the enclosure 42 as shown in FIG. 7B. Alternatively, the two may be carried separately. For example, one person may carry the system 40 in one hand and the ICE generator 250 in his or her other hand. The ICE generator 250 may supply the power supply module 52 with the input AC voltage for recharging the battery cells and/or powering the control module 54.

Figure 8:
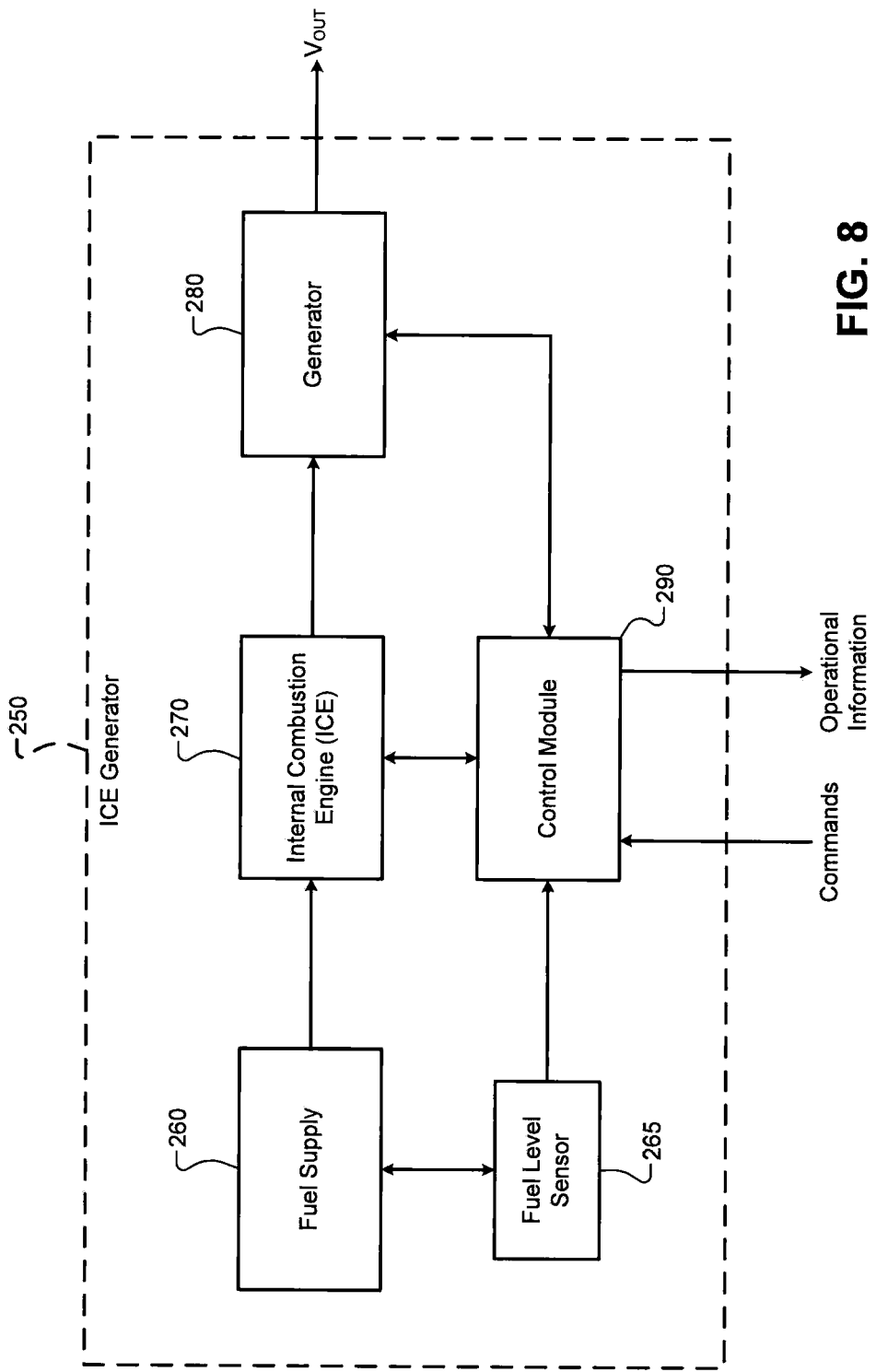
FIG. 8 is a functional block diagram of an ICE generator according to one implementation of the present disclosure.

FIG. 8 illustrates an example of the ICE generator 250. The ICE generator 250 may include a fuel supply 260, a fuel level sensor 265, an internal combustion engine (ICE) 270, an electric generator 280, and a control module 290. The fuel supply 260 supplies the ICE 270 with fuel (e.g., gasoline). The fuel level sensor 265 measures a level of fuel contained in the fuel supply 260. The ICE 270 combines the fuel with air and combusts the air/fuel mixture within cylinders to generate drive torque. For example, the ICE 270 may be started automatically using suitable systems such as a starter or an ignition module. The drive torque generated by the ICE 270 is converted to electrical energy by the generator 280. The generator 280 may output the electrical energy as an AC voltage $V_{OUT}$. The control module 290 controls operation of the ICE generator 250. Specifically, the control module 290 controls start/stop operations of the ICE 270. Additionally, the control module 290 may also monitor the fuel level using the fuel level sensor 265. Furthermore, the control module 290 may transmit operational information to other components and/or receive commands from other components (described in more detail below). For example, the control module 290 may transmit a fuel level of the fuel supply 260 to other components such as the system 40 or a handheld monitoring device (described in more detail later).

Figure 9:
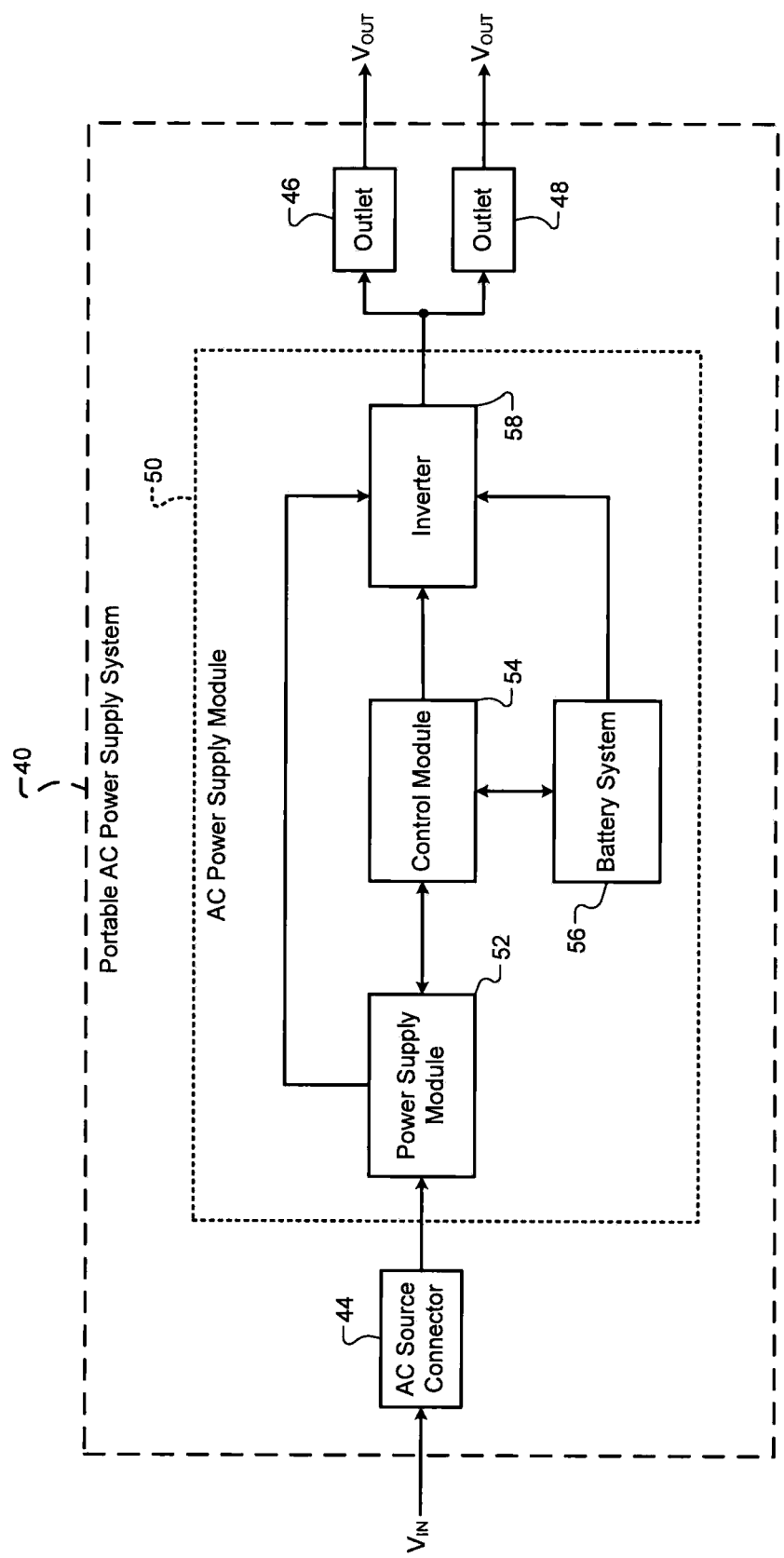
FIG. 9 is a functional block diagram of the portable AC power supply system having a direct feed-through of an external AC power source according to one implementation of the present disclosure.

According to another feature, the system 40 may include a direct feed-through whereby the external AC power source is used as a main source of power. FIG. 9 illustrates an example of the portable AC power supply system 40 having an AC power supply module 50 with a direct feed-through. Specifically, the external AC power source (e.g., a wall outlet or an ICE generator) provides power directly to the inverter 58 while the battery system 56 is selectively used when the external AC power source is insufficient or fails (e.g., a line dropout). For example, the control module 54 may monitor the external AC power source (e.g., via the power supply module 52) to determine when the external AC power source is insufficient or has failed. The control module 54 may then begin discharging the battery system 56 to power the inverter 58 and any components connected to outlets 46, 48. Having the battery system 56 to power the inverter 58 during failure conditions provides for seamless transitions between power sources (i.e., no power outages).

For example, the system 40 of FIG. 9 may be implemented as immediate backup power in residential applications. The inverter 58 may also synchronize its output AC power with the external AC power. Specifically, the inverter 58 and the power supply module 52 may communicate to synchronize the output AC power to the external AC power. In other words, the output AC power of the inverter 58 may be in-phase with the external AC source. Having the inverter 58 in-phase with the external AC source may also provide for seamless transitions when the external AC source fails and the battery system 56 is then used. For example, the inverter 58 may send messages to the power supply module 52 requesting phase information of the external AC power, the power supply module may then send messages back to the inverter 58, and the inverter 58 may then adjust a phase of the output AC waveform based on the received messages (including the requested phase information).

Additionally, a plurality of systems 40 may be connected in parallel to provide increased power output. The outputs of each of the plurality of systems 40 may also be synchronized with each other to provide maximum power output. For example only, two systems 40 may be connected in parallel to generate greater than or equal to 6000 W of peak power (i.e., 3000 W×2 systems=6000 W). In some implementations, one of the plurality of systems 40 may act as a master with the remaining systems 40 acting as slaves (i.e., the master synchronizes the slaves to its output). For example, one of the plurality of systems 40 ("a slave system") may send messages to another one of the plurality of systems 40 ("a master system") requesting phase information of the output AC waveform of the master system. The master system may then send messages back to the slave system, and the slave system may then adjust a phase of its output AC waveform based on the received messages (including the requested phase information). Therefore, the slave system may synchronize its output to the output of the master system.

According to another feature, the system 40 may automatically adjust the current drawn from the ICE generator 250. In an exemplary embodiment, the control module 54 may variably control the current supplied by a charging circuit to the batteries and thereby control the current drawn from the ICE generator 250. For example, the control module 54 may decrease a current drawn from the ICE generator 250 when the input AC waveform is sagging (i.e., drops below a threshold). In other words, the system 40 may decrease the current draw to prevent overloading of the external AC source (e.g., the ICE generator 250). For example only, if the ICE generator 250 is capable of generating 100 W and a standard current draw of the system is 1.5 amps (A), the charge range of the system 40 will be between 300 and 400 W (i.e., ~180 V×1.5 A=360 W). Therefore, if not limited, the current draw of the system 40 could overload and damage the ICE generator 250. These techniques for monitoring current draw and overload protection may be similarly applied to other external AC sources such as a solar panel or a wind turbine.

Alternatively, the system 40 may transmit an inquiry to the ICE generator 250 as to how much power the ICE generator 250 can generate, and the system 40 may then adjust the current draw from the ICE generator based on the transmitted response from the ICE generator 250 (described in more detail later with respect to FIGS. 10A-10B). Additionally, a user may manually adjust the current draw of the system 40 from the ICE generator 250. For example, the user may control a rotatable switch to select an input power to draw from the ICE generator (e.g., 250 W, 500 W, 750 W, 1000 W, etc.). The user may select an input power less than a maximum output power of the ICE generator 250 to allow the ICE generator 250 to power other components.

According to another feature and as previously described, the system 40 may also have remote monitoring and/or control features. For example, a user may be working via an extension cord at a location far from the system 40 or on a different level of a building. Therefore, remote monitoring may allow the user to determine, for example, when the charge level of the battery system 56 is low. Additionally, remote control of the system 40 may also be beneficial. For example, when the charge level of the battery system 56 is low the user may remotely activate the ICE generator 250 to begin recharging the battery system 56. Accordingly, remote monitoring and control of the system 40 may increase user efficiency which in turn may reduce costs.

FIG. 10A illustrates a functional block diagram of the system 40, the ICE generator 250, and the mobile device 300. The system 40, the ICE generator 250, and the mobile device 300 are each capable of communicating via a radio frequency (RF) communication channel. For example, these components may communicate via the RF channel according to a suitable IEEE communication protocol (e.g., Bluetooth). The system, the ICE generator 250, and the mobile device 300, however, may also communicate using other suitable wireless communication methods and/or protocols. While each of the system 40, the ICE generator 250, and the mobile device 300 are shown to include two modules, each may further include additional modules or components such as those described herein.

Specifically, the system 40 may include a communication module 305 that may transmit information (e.g., using a transceiver) to the mobile device 300 via the RF communication channel. For example, the information may include, but is not limited to, a charge level of the battery system 56, a load connected to the system, an output voltage of the system, whether or not the system is connected to a charger, etc. Additionally, for example, the system may transmit fault conditions to the mobile device. The transmitted information may be received (e.g., using a transceiver) by a communication module 310 in the mobile device. The received information may be sent to a user interface module 320 which may then display the information to the user (e.g., via the display 275). In other words, the user may be located at a remote location with respect to the system 40 but may still monitor the system 40.

The user may also input commands (e.g., via a touchpad) to the user interface module 320. The user interface module 320 may send the commands to the communication module 310 for transmission back to the system 40. In other words, the user may command the ICE generator 250 via the mobile device 300. For example, the user may start the ICE generator 250 when the charge level in the battery system is less than a first level (e.g., a critical threshold corresponding to the peak of the desired AC output). Similarly, for example, the user may stop the ICE generator 250 when the charge level of the battery system 56 is greater than or equal to a second level (e.g., full charge).

The commands for the ICE generator 250 may be sent by the user (a "manual command") using the mobile device 300 and relayed to the ICE generator 250 by system 40. Additionally or alternatively, the system 40 may automatically send a command (an "automatic command") to start/stop the ICE generator, such as when the system detects that the charge level of the battery system is less than a threshold. When the ICE generator 250 receives a command via communication module 330, the communication module 330 may send the command to the control module 290. The control module 290 may then start or stop the ICE generator 250 based on the received command. The control module 290 may also include sensors for measuring operating parameters. For example, the control module 290 may use the fuel level sensor 265 to measure an amount of fuel in the ICE generator 250 for transmission to the system 40 and/or the mobile device 300.

Figure 10B:
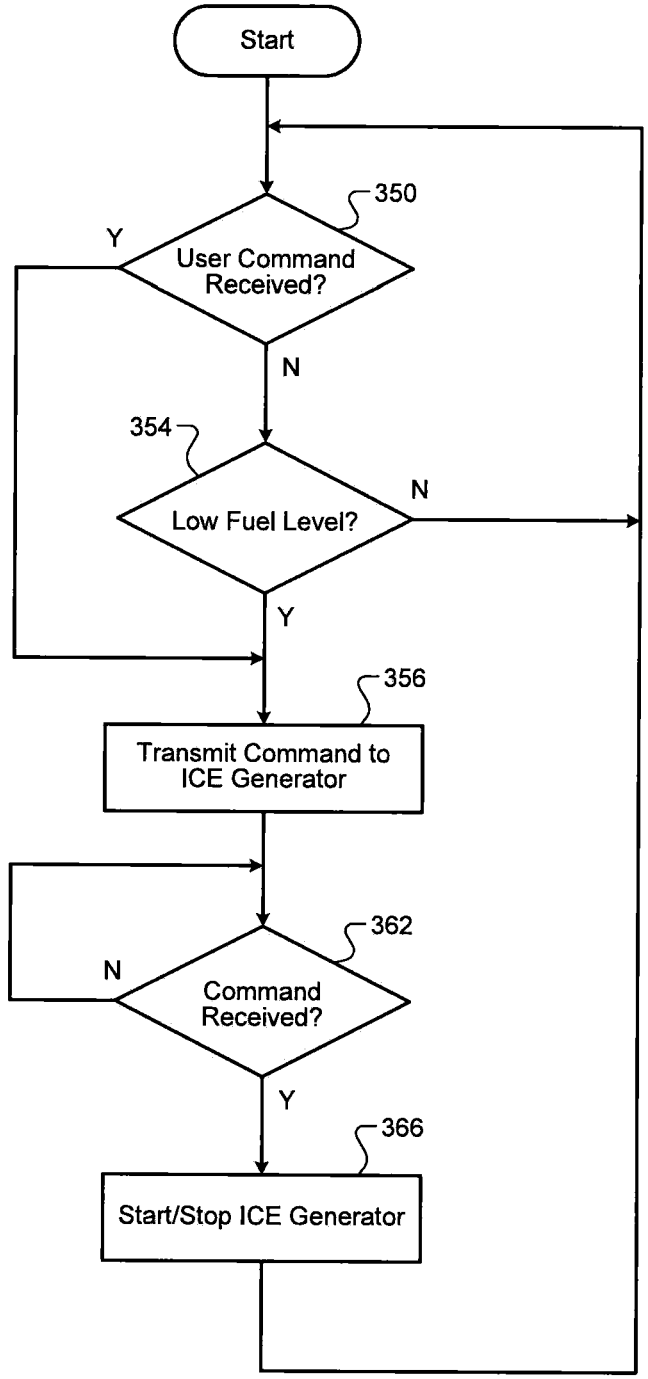
FIG. 10B is a flow diagram of a method for remote monitoring and control of the ICE generator according to one implementation of the present disclosure.

FIG. 10B illustrates a method for remote control of the ICE generator 250. While only remote control of the ICE generator 250 is described, other monitoring and control function may be implemented via communication across the RF communication channel. For example, the mobile device 300 may be used by a user for remote monitoring and/or control of the system 40 and/or the ICE generator 250. For example, the method may be executed by the control module 54. The method begins at 350. At 350, the control module 54 determines whether a command has been received to start/stop the ICE generator 250 ("a manual start/stop"). For example, the user may input the command to the user interface module 320 of mobile device 300 which may then transmit the command to the control module 54. If true, the control module 54 may proceed to 358. If false, the control module 54 may proceed to 354.

At 354, the control module 54 may determine whether any fault conditions are present that require a start/stop operation of the ICE generator 250 ("an automatic start/stop"). For example, the control module 54 may determine whether a fuel level of the ICE generator 250 is less than a predetermined threshold. Alternatively, for example, the control module 54 may determine whether a charge level of the battery system 56 is less than a predetermined threshold. In some embodiments, the fuel level may be transmitted to the control module 54 by the ICE generator 250 (e.g., in response to a query). If true, the control module 54 may proceed to 358. If false, the control module 54 may return to 350 (i.e., no manual or automatic start/stop operations).

At 358, the control module 54 transmits a command to communication module 330 to start/stop the ICE generator 250. At 362, the control module 290 determines whether the transmitted command was received (e.g., via communication module 330). If true, the control module 290 may proceed to 366. If false, the control module 290 may return to 362. At 366, the control module 290 may start/stop the ICE generator 250 according to the received command. For example, the control module 290 may start/stop the ICE 270 via a starter or ignition module (previously described). The method may then return to 350.

Figure 11A:
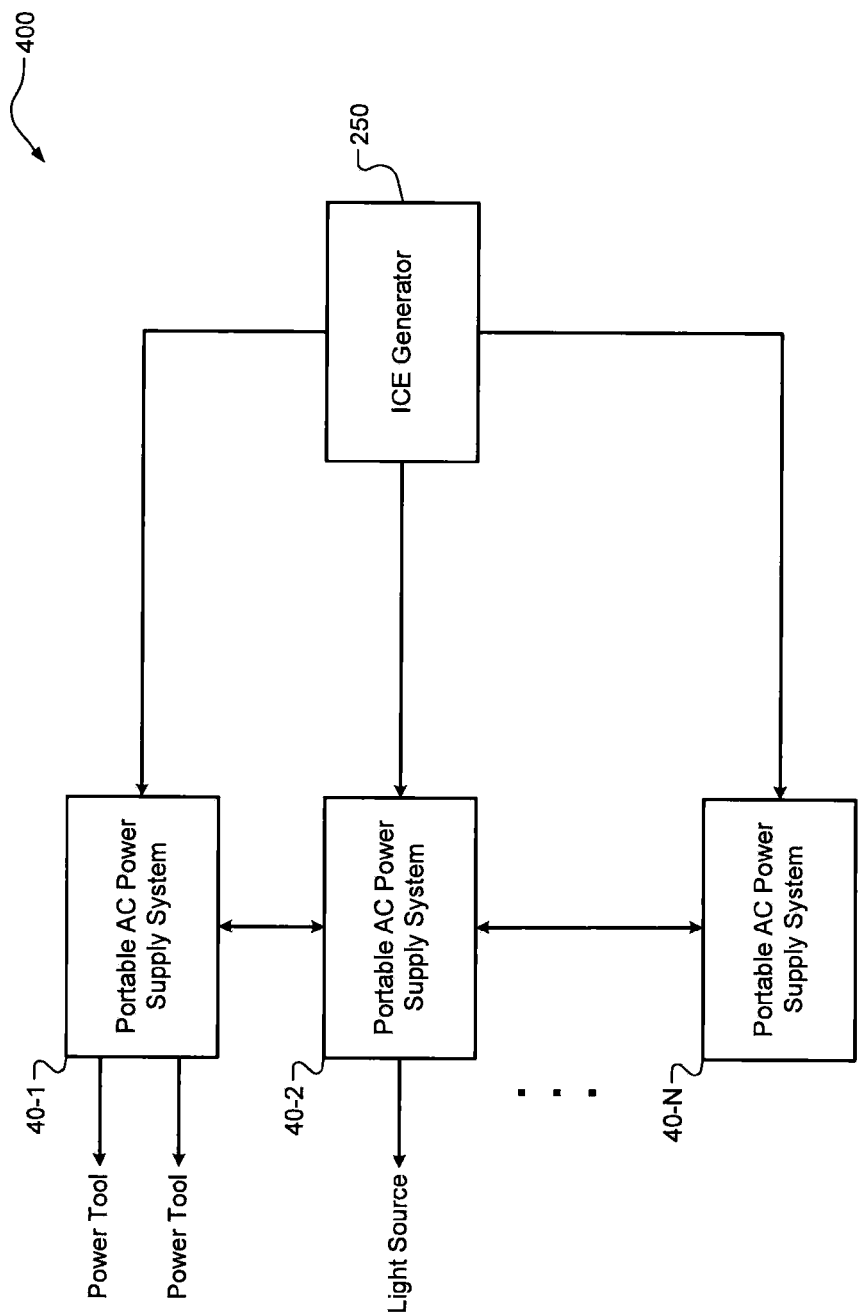
FIG. 11A is a functional block diagram of a plurality of portable AC power supply systems capable of charging via a single ICE generator according to one implementation of the present disclosure.

According to another feature, the user may plug one or more portable AC power supply systems 40 into a single ICE generator 250 if more than one portable AC power supply system is needed at a jobsite. In a typical situation, an unequal amount of power may be drawn from these portable AC power supply systems. As an example, the user may plug two portable AC power supply systems 40 into the same ICE generator 250 for charging. FIG. 11A illustrates an example implementation of a system 400 having N portable AC power supply systems 40-1, 40-2, . . . , 40-N (collectively referred to as "systems 40") connected to a single ICE generator 250.

For example, portable AC power supply system 40-1 may have two power tools plugged into it that draw an average load of 2000 W. Since the ICE generator 250 can only supply a limited amount of charging power, the ICE generator 250 may not be able to charge all the systems 40 at full power. If each of the systems 40 monitors its own load and battery supply, the systems 40 can collectively determine which of the systems 40 should receive charge current and control their own charging accordingly. The following example shows how the inverters may decide how to control their individual charge.

If system 40-2 is merely powering a light load (e.g., a light source) and has only ½ of its battery charge remaining, and system 40-1 (powering the large load power tools) still has ¾ of its charge remaining, the ICE generator 250 would ordinarily deliver more or an equal amount of power to the system 40-2. However, since system 40-1 is supplying far more power, the battery in system 40-1 will run out of charge much sooner than system 40-2. In the improved cooperative scenario, since system 40-2 can calculate its own remaining runtime and a remaining runtime of system 40-1, system 40-2 will choose to forego charging so that system 40-1 can receive all of the power from the ICE generator 250. This allows the systems 40 to optimize runtime of the entire system 400.

Figure 11B:
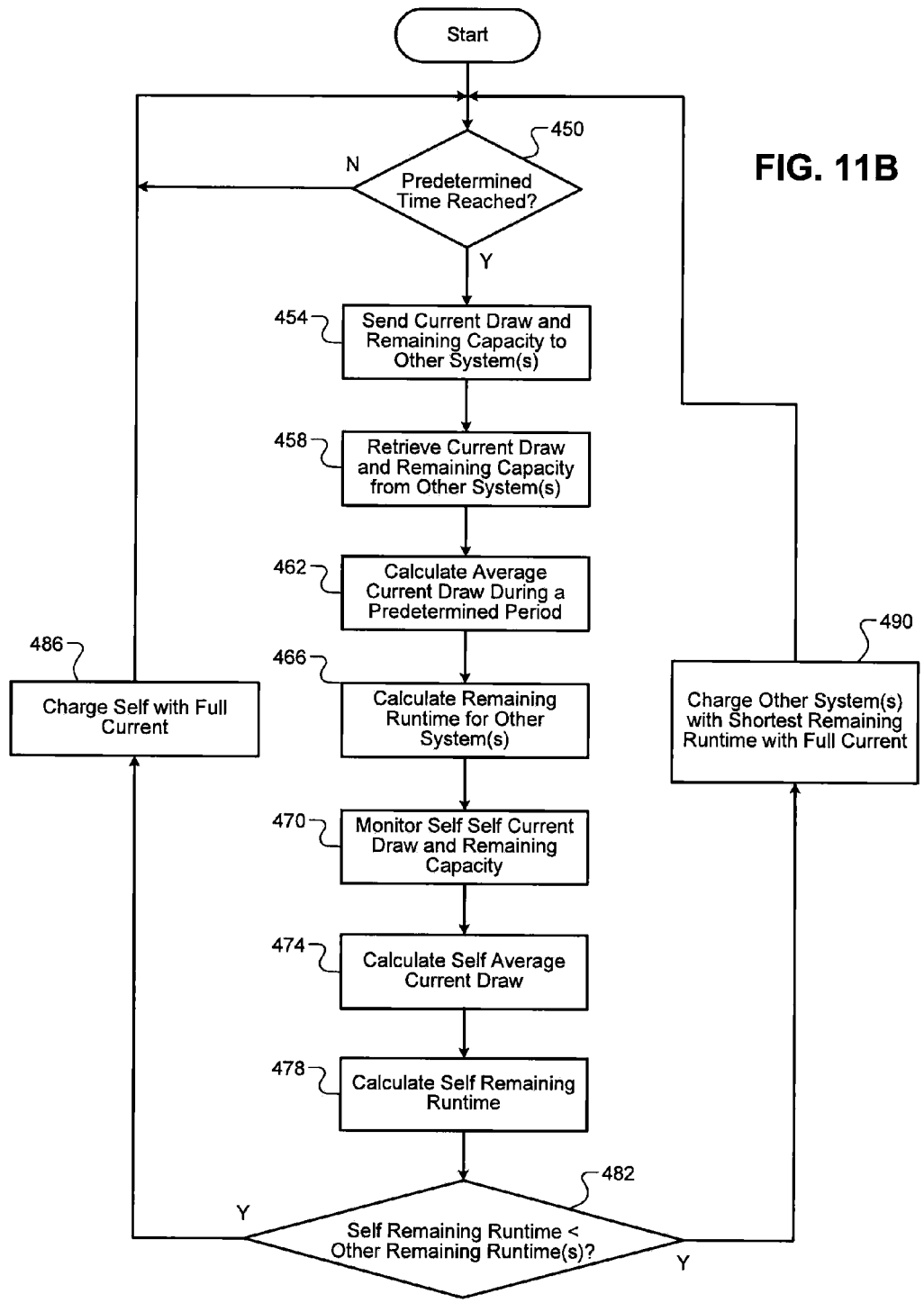
FIG. 11B is a flow diagram of a method for monitoring and controlling charging of a plurality of portable AC power supply systems according to one implementation of the present disclosure.

FIG. 11B illustrates a method for monitoring and controlling charging of a plurality of systems 40. For example, the method may be executed by one of the control modules 54 located in the various systems 40. The method begins at 450. At 450, the control module 54 may determine whether a predetermined time has expired. For example, the control module 54 may determine whether a timer exceeds a predetermined time of 100 milliseconds. If true, the control module 54 may proceed to 454. If false, the control module 54 may return to 450. At 454, the control module 54 may send its current draw (from the ICE generator 250) and its remaining capacity (in its battery system 56) to other the system(s) 40. At 458, the control module 54 may retrieve the current draw and remaining capacity from the other system(s) 40. At 462, the control module 54 may calculate an average current draw of the other system(s) during a period. For example, the period may be one minute. At 466, the control module 54 may calculate a remaining runtime of the other system(s) 40 by dividing remaining capacity by average current draw.

At 470, the control module 54 may monitor its own current draw and remaining capacity. At 474, the control module 54 may calculate its average current draw during a period (e.g., one minute). At 478, the control module 54 may calculate its remaining runtime (e.g., remaining self capacity/average self current draw). At 482, the control module 54 determines whether its remaining runtime is less than the remaining runtime(s) of the other system(s) 40. If true, the control module 54 may proceed to 486. If false, the control module 54 may proceed to 490. At 486, the control module 54 may draw all of the current from the ICE generator 250 to charge its battery system 56. The method may then return to 400. At 490, the control module 54 may disable charging of its battery system 56. All of the current from the ICE generator 250 may then be used to charge a battery system 56 of the system 40 having the shortest remaining runtime. The method may then return to 400.

In the previous examples, the systems 40 either chose to receive full charge or no charge. An alternative embodiment would allow the systems 40 to variably control the amount of current they each receive. Referring again to FIG. 11A, system 40-2 may calculate that in order to allow itself and system 40-1 to run out of power at the same time (thus optimizing runtime of the system 400), that system 40-2 should receive 10% of the charging power to allow system 40-1 to receive 90% of the charging power. In some implementations, each of the systems 40 may vary an amount of charging power received from the ICE generator 250 by controlling respective internal charging circuits to vary charging of the respective battery systems 56. Lastly, while examples power control distribution between two of the systems 40 were described herein, the same examples may be similarly applies to three or more of the systems 40.

The description herein is merely illustrative in nature and is in no way intended to limit the disclosure, its application, or uses. For purposes of clarity, the same reference numbers are used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. A portable power supply apparatus comprising:
   a portable housing;
   at least one battery generating a direct current (DC) voltage having a magnitude greater than or equal to a peak value of a desired alternating current (AC) voltage; and an inverter circuit coupled to the at least one battery to receive the generated DC voltage, convert the generated DC voltage to an AC output voltage and output the AC output voltage to one or more outlets of the portable housing.

2. The portable power supply apparatus, as recited in claim 1, wherein the at least one battery generates a DC voltage having a magnitude greater than 150 volts (V).

3. The portable power supply apparatus, as recited in claim 1, wherein the inverter circuit modifies a waveform of the AC output voltage when the at least one battery generates a DC voltage having a magnitude less than the peak value of the desired AC voltage.

4. The portable power supply apparatus, as recited in claim 3, wherein the inverter circuit increases a duty cycle of pulse-width modulated (PWM) signals that control switching in the inverter circuit to maintain a root-mean-square (RMS) of the AC output voltage greater than or equal to an RMS of the desired AC voltage.

5. The portable power supply apparatus, as recited in claim 1, further comprising a power supply module configured to receive an AC input signal from a power source external to the housing, the power supply module provides a charging current to the at least one battery.

6. The portable power supply apparatus, as recited in claim 5, further comprising a control module configured to monitor a charge level of the at least one battery and selectively control the power supply module to charge the at least one battery.

7. The portable power supply apparatus, as recited in claim 5, wherein the power supply module includes a battery charge circuit electrically coupleable to an AC power plug.

8. A portable power supply apparatus comprising:
a portable housing, the housing having an exterior surface, the exterior surface having at least one outlet for providing an alternating current (AC) output voltage;
a battery system having at least one battery, wherein the at least one battery generates a direct current (DC) voltage having a magnitude greater than or equal to a peak value of the AC output voltage; and
an inverter circuit configured to receive the generated DC voltage having the magnitude from the at least one battery and convert the generated DC voltage having the magnitude to the AC output voltage.

9. The portable power supply apparatus, as recited in claim 8, wherein the portable power supply apparatus has a weight and outputs electrical power at a power-to-weight ratio greater than 50 watts (W) per pound.

10. The portable power supply apparatus, as recited in claim 8, further comprising a power supply module residing in the housing, the power supply module configured to receive an AC input signal from a power source external to the housing and provide a charging current to the at least one battery.

11. The portable power supply apparatus, as recited in claim 10, further comprising a control module configured to monitor charge level of the at least one battery and selectively control the power supply module to charge the at least one battery.

12. The portable power supply apparatus, as recited in claim 8, wherein the inverter circuit modifies a waveform of the AC output voltage when the at least one battery generates a DC voltage having a magnitude less than a peak value of the desired AC voltage.

13. The portable power supply apparatus, as recited in claim 12, wherein the inverter circuit increases a duty cycle of pulse-width modulated (PWM) signals that control switching in the inverter circuit to maintain a root-mean-square (RMS) of the AC output voltage greater than or equal to an RMS of the desired AC voltage.

14. The portable power supply apparatus, as recited in claim 8, wherein the at least one battery includes one or more replaceable battery units, the replaceable battery units each having a storage capacity less than or equal to the storage capacity of the battery system.

15. A portable power supply apparatus comprising:
a portable housing;
a battery system comprising at least one battery coupleable to the housing, the at least one battery generating a direct current (DC) voltage having a magnitude greater than or equal to a peak value of a desired alternating current (AC) voltage; and
an inverter circuit residing in the housing, the inverter circuit configured to receive the generated DC voltage having the magnitude from the at least one battery, convert the generated DC voltage to an AC output voltage and output the AC output voltage to one or more outlets exposed on an exterior surface of the portable housing.

16. The portable power supply apparatus, as recited in claim 15, wherein the at least one battery generates a DC voltage having a magnitude greater than 150 volts (V).

17. The portable power supply apparatus, as recited in claim 15, wherein the inverter circuit modifies a waveform of the AC output voltage when the at least one battery generates a DC voltage having a magnitude less than the peak value of the desired AC voltage.

18. The portable power supply apparatus, as recited in claim 17, wherein the inverter circuit increases a duty cycle of pulse-width modulated (PWM) signals that control switching in the inverter circuit to maintain a root-mean-square (RMS) of the AC output voltage greater than or equal to an RMS of the desired AC voltage.

19. The portable power supply apparatus, as recited in claim 15, further comprising a control module configured to monitor a charge level of the at least one battery and selectively control the power supply module to charge the battery system.

20. The portable power supply apparatus, as recited in claim 15, wherein the power supply module includes a battery charge circuit electrically coupleable to an AC power plug.

* * * * *